(12) United States Patent
Rabipour et al.

(10) Patent No.: US 8,194,649 B2
(45) Date of Patent: Jun. 5, 2012

(54) METHODS AND APPARATUS FOR DATA COMMUNICATION

(75) Inventors: Rafi Rabipour, Cote St-Luc (CA); Chung Cheung C. Chu, Brossard (CA); Pierre Gendron, Auteuil-Laval (CA); William Navarro, Velizy-Villacoublay (FR); Paul Boudreaux, Garland, TX (US)

(73) Assignee: Rockstar BIDCO LP., New York, NY (US)

( * ) Notice: Subject to any disclaimer, the term of this patent is extended or adjusted under 35 U.S.C. 154(b) by 15 days.

(21) Appl. No.: 12/458,883

(22) Filed: Jul. 27, 2009

(65) Prior Publication Data
US 2010/0039949 A1 Feb. 18, 2010

Related U.S. Application Data

(63) Continuation of application No. 10/235,959, filed on Sep. 6, 2002, now Pat. No. 7,639,601.

(60) Provisional application No. 60/393,386, filed on Jul. 5, 2002, provisional application No. 60/395,271, filed on Jul. 12, 2002.

(51) Int. Cl.
*H04L 12/66* (2006.01)
(52) U.S. Cl. ........................................ 370/354; 370/401
(58) Field of Classification Search ........................ None
See application file for complete search history.

(56) References Cited

U.S. PATENT DOCUMENTS

| | | |
|---|---|---|
| 3,652,798 A | 3/1972 | McNeilly et al. |
| 4,048,446 A | 9/1977 | Hafner et al. |
| 4,545,052 A | 10/1985 | Steierman |
| 5,295,136 A | 3/1994 | Ashley et al. |
| 5,740,157 A | 4/1998 | Demiray et al. |
| 5,933,487 A | 8/1999 | Strickland |
| 6,078,595 A | 6/2000 | Jones et al. |
| 6,141,784 A | 10/2000 | Davis et al. |
| 6,144,667 A | 11/2000 | Doshi et al. |

(Continued)

FOREIGN PATENT DOCUMENTS

EP 0 907 280 A2 4/1999

(Continued)

OTHER PUBLICATIONS

Communication Relating to the Results of the Partial International Search of International Patent Application No. PCT/CA2003/000972, Nov. 3, 2003, 2 pages.

(Continued)

*Primary Examiner* — Chirag Shah
*Assistant Examiner* — Joshua Smith (57) ABSTRACT

Data communication apparatus including a port and a control entity. The control entity is operative to establish a connection with a remote entity over a first path and negotiate with the remote entity using in-band signaling over the first path establishment of a second path allowing the exchange of data between the data communication apparatus and the remote entity. The invention presents advantages from the standpoint of ease of implementation and bandwidth and resource savings. The use of an in-band messaging protocol to negotiate a establishment of the second path can be implemented generally in a straight forward manner. At the same time, the ability to transfer at least part of the connection to the second path avoids the drawbacks that would arise if that part of the connection were constrained to the first path. This feature allows the operator to take advantage of benefits provided by the second path but not available to the first path.

21 Claims, 8 Drawing Sheets

U.S. PATENT DOCUMENTS

| | | | | |
|---|---|---|---|---|
| 6,172,990 | B1 | 1/2001 | Deb et al. | |
| 6,185,424 | B1 | 2/2001 | Pon et al. | |
| 6,256,612 | B1 | 7/2001 | Vo et al. | |
| 6,272,358 | B1 | 8/2001 | Brent et al. | |
| 6,275,578 | B1 | 8/2001 | De Trana et al. | |
| 6,282,192 | B1 * | 8/2001 | Murphy et al. | 370/352 |
| 6,353,666 | B1 | 3/2002 | Henderson et al. | |
| 6,389,119 | B1 * | 5/2002 | McBride | 370/352 |
| 6,414,964 | B1 | 7/2002 | Holmquist et al. | |
| 6,452,924 | B1 * | 9/2002 | Golden et al. | 370/352 |
| 6,542,499 | B1 * | 4/2003 | Murphy et al. | 370/352 |
| 6,574,469 | B1 | 6/2003 | Xiang et al. | |
| 6,600,738 | B1 | 7/2003 | Alperovich et al. | |
| 6,721,269 | B2 | 4/2004 | Cao et al. | |
| 6,778,517 | B1 | 8/2004 | Lou et al. | |
| 6,781,983 | B1 | 8/2004 | Armistead | |
| 6,842,461 | B2 | 1/2005 | Harris | |
| 6,868,080 | B1 * | 3/2005 | Umansky et al. | 370/354 |
| 6,885,638 | B2 | 4/2005 | Xu et al. | |
| 6,917,613 | B1 * | 7/2005 | Tiburtius et al. | 370/353 |
| 6,956,816 | B1 | 10/2005 | Alexander et al. | |
| 6,985,530 | B1 | 1/2006 | Zerbe | |
| 6,999,459 | B1 | 2/2006 | Callon et al. | |
| 7,002,908 | B1 * | 2/2006 | Lund et al. | 370/356 |
| 7,085,289 | B2 | 8/2006 | Cromer et al. | |
| 7,136,375 | B1 | 11/2006 | Koistinen | |
| 7,233,595 | B1 | 6/2007 | Hollis et al. | |
| 7,502,362 | B1 * | 3/2009 | Koskinen et al. | 370/352 |
| 2002/0054571 | A1 | 5/2002 | Falsafi | |
| 2003/0072273 | A1 | 4/2003 | Aiello et al. | |
| 2003/0135376 | A1 | 7/2003 | Harada | |
| 2004/0100914 | A1 | 5/2004 | Hellwig et al. | |
| 2004/0252674 | A1 * | 12/2004 | Soininen et al. | 370/352 |
| 2006/0046658 | A1 | 3/2006 | Cruz et al. | |

FOREIGN PATENT DOCUMENTS

EP    1 076 466 A1    2/2001

OTHER PUBLICATIONS

"Digital Cellular telecomunication system . . . ", XP002248624, 3GPP TS 28.062 version 5.0.0 Release 5, ETSI TS 128 062 V5.0.0, Mar. 2002, pp. 14-19,35-51,56-59,81-88,164-168.

Office Action mailed on Jul. 12, 2007 in connection with corresponding U.S. Appl. No. 10/235,959.

Office Action mailed on May 14, 2008 in connection with corresponding U.S. Appl. No. 10/235,959.

Office Action mailed on Jul. 25, 2008 in connection with corresponding U.S. Appl. No. 10/235,959.

Office Action mailed on Mar. 3, 2009 in connection with corresponding U.S. Appl. No. 10/235,959.

Office Action mailed on May 17, 2007 in connection with corresponding U.S. Appl. No. 10/682,070.

* cited by examiner

METHODS AND APPARATUS FOR DATA COMMUNICATION

CROSS-REFERENCES TO RELATED APPLICATIONS

This application is a continuation, and claims the benefit under 35 U.S.C. 120, of U.S. patent application Ser. No. 10/235,959 filed on Sep. 6, 2002 now U.S. Pat. No. 7,639,601.

This application claims the benefit of U.S. Provisional Patent Application Ser. No. 60/393,386 to Rabipour et al., filed on Jul. 5, 2002 and U.S. Provisional Patent Application Ser. No. 60/395,271 to Rabipour et al., filed on Jul. 12, 2002.

FIELD OF THE INVENTION

The present invention relates generally to communications networks and, more particularly, to methods and apparatus for increasing the service quality and efficiency with which data is communicated between entities in such networks.

BACKGROUND OF THE INVENTION

According to most existing telecommunications standards, the transmission of speech information over a wireless interface takes the form of compressed speech parameters. Upon receipt of compressed speech parameters at a base station in communication with a mobile unit, the speech parameters are processed by a codec (coder/decoder), which converts (expands) the speech parameters into speech samples, typically at a rate of 64 kilobits per second (kb/s) in order to provide compatibility with the public switched telephone network (PSTN). The speech samples at 64 kb/s are then transmitted over the PSTN towards the called party. The speech samples associated with a given call may share the same link as speech samples associated with other calls by virtue of time division multiplexing (TDM), which provides for fixed-duration time slots to be allotted to individual calls.

If the called party is connected directly to the PSTN, such as via a wireline connection, the speech samples having travelled through the network will simply be converted into audio form by a digital telephone unit at the called party site. Of course, the called party may also be a second mobile unit, in which case the speech samples will terminate at a second base station, where a second codec re-converts the speech samples back into compressed speech parameters for transmission to the second mobile unit via a wireless interface. The usage of a source decoder to expand speech parameters into a stream of speech samples, in combination with the use of a destination encoder for re-compression of these samples into a second set of compressed speech parameters, is referred to as operation of codecs in tandem, or "tandem operation".

Those skilled in the art will appreciate that when both the called and calling parties are mobile units, the tandem operation described above introduces a degradation in service quality, as errors may be introduced by the decompression and re-compression operations performed by the source and destination codecs, respectively. Such error should in principle be avoidable, as neither codec operation is required by virtue of the second base station requiring the compressed speech parameters rather than the expanded speech samples. Thus, it is of interest to find a solution to the problem of service quality in call connections involving tandem codecs.

Two classes of solutions to the problem relating to the service quality in call connections involving tandem codecs have already been described and standardized, or are well in their way towards standardization. The earlier of the two methods, called Tandem-Free Operation (TFO), uses an in-band handshaking protocol to detect the presence of tandem codecs, and then proceeds to insert the compressed speech parameters within the 64 kb/s sample stream. This arrangement bypasses the requirement for decompression at the source codec and (re-)compression at the destination codec, which obviates the occurrence of errors at these two stages. As a result, a high quality of service can be achieved for a given end-to-end call between two mobile units. However, the standardized TFO approach provides no bandwidth advantage, as the full bandwidth ordinarily needed for the 64 kb/s sample stream is consumed for transmission of the compressed speech parameters.

A more recent approach, called Transcoder-Free Operation (TrFO), uses out-of-band signaling to detect call scenarios involving tandem codecs at call set-up time. Thereupon action is taken to put in place a direct end-to-end link to provide for a direct exchange of the compressed speech parameters without the involvement of network transcoders. However, while it provides for a savings and resource reduction compared to the standardized TFO approach, the TrFO implementation suffers from the disadvantage of added cost and complexity due to, for example, the requirement for out-of-band signaling.

From the above, it will be apparent that there is a need in the industry to provide a solution that is as robust and easy to implement as TFO, while providing the bandwidth and resource savings of TrFO.

Moreover, the use of TFO has heretofore been limited to enhancing the quality of calls established between two TFO-enabled base station units in a mobile-to-mobile call. When one party is not a TFO-enabled base station unit, e.g., a telephone connected to a common packet-switched network via a network gateway, the use of TFO is not possible. It would therefore be an advantage to exploit the ability of one party's TFO capabilities, even when the other party is not a TFO-enabled base station unit.

In addition, the use of TFO is often limited by the use of backhaul gateways in a network, even when both parties to a call are TFO-enabled base station units. Such gateways compress speech samples into a different format prior to transmittal of the formatted speech samples over a network. Unfortunately, when TFO information is carried within the bit structure of the speech samples, the compression effected by a backhaul gateway results in loss of the TFO information and hence prevents advantageous usage of this facility. Hence, it would be beneficial to be able to allow tandem-free operation in circumstances where a backhaul gateway is used.

For more information on the TFO and TrFO techniques, the reader is invited to refer to the following documents that are hereby incorporated by reference:

$3^{rd}$ generation partnership project, Technical specification group core network, Out of band transcoder control—Stage 2 (3GPP TS 23.153 V4.4.0 (2001-12));

$3^{rd}$ generation partnership project, Technical specification group core network, Bearer-independent circuit-switched core network, Stage 2 (3GPP TS 23.205 V4.4.0 (2002-03));

$3^{rd}$ generation partnership project, Technical specification group (TSG) RAN3, Transcoder free operation (3GPP TR 25.953 V4.0.0 (2001-03));

$3^{rd}$ generation partnership project, Technical specification group services and system aspects, Inband tandem free operation (TFO) of speech codecs, service description—Stage 3 (3GPP TS 28.062 V5.0.0 (2002-03));

SUMMARY OF THE INVENTION

According to a broad aspect, the invention provides a data communication apparatus, including a port for enabling data communication with a remote entity via a network and a control entity in communication with the port. The control entity is operative to establish a connection with the remote entity over a first communication path through the network and negotiate with the remote entity using in-band signaling over the first communication path establishment of a second communication path between the data communication apparatus and the remote entity allowing the transmission of data from one of the data communication apparatus and the remote entity to the other of the data communication apparatus and the remote entity.

The invention presents advantages from the standpoint of ease of implementation and bandwidth and resource savings. The use of an in-band messaging protocol to negotiate a establishment of the second communication path can be implemented generally in a straight forward manner. At the same time, the ability to transfer at least part of the connection to the second communication path avoids the drawbacks that would arise if that part of the connection were constrained to the first communication path. This feature allows the operator to take advantage of benefits provided by the second communication path but not available to the first communication path. Those benefits may include increased bandwidth, among others.

In a specific and non-limiting example of implementation, the first communication path is a circuit-switched path. This path is used by the data communication apparatus to establish a tandem-free data connection with the remote entity. Subsequently, the control entity negotiates with the remote entity to transfer the tandem-free data connection over a second communication path in a packet-switched network. The second communication path is defined by the address of the data communication apparatus and by the address of the remote entity.

During the negotiation, the respective addresses are exchanged via in-band signaling over the first communication path. After the address exchange is effected and any other steps necessary to complete the establishment of the second communication path, the data communication apparatus starts sending data to the address of the remote entity and the remote entity starts sending data to the address of the data communication apparatus. At this point, the transfer of the tandem-free data connection is completed. The negotiation and establishment primarily use in-band signaling, although the use of out-of-band signaling is not excluded.

In a specific and non-limiting example of implementation, the connection conveys audio information, such as a voice call.

According to a second broad aspect, the invention provides a gateway, including an interface for allowing establishment of an end-to-end connection between a first remote entity and a second remote entity. The gateway also includes a control entity operative to monitor the end-to-end connection and detect the presence of in-band messages received from the first remote entity, the in-band messages being indicative of an attempt by the first remote entity to enter a tandem-free mode of operation. In the absence of an in-band response message from the second remote entity, the control entity is operative to generate and send an in-band response message to the first remote entity and negotiate therewith establishment of a second connection with the first remote entity, while maintaining the portion of the end-to-end connection between the gateway and the second remote entity.

According to a third broad aspect, the present invention provides a gateway, including an interface for allowing establishment of a data connection between a first remote entity and a second remote entity. The gateway also includes a processing entity operative to convert data received from the first remote entity and destined for the second remote entity from a first format to a second format different from the first format. Furthermore, the gateway includes a control entity operative to monitor the data connection established between the first remote entity and the second remote entity, detect the presence of in-band messaging information among the data received from the first remote entity in the first format and destined for the second remote entity and cause the in-band messaging information to be sent to the second remote entity separately from the data in the second format.

According to a third broad aspect, the present invention provides a gateway, including an interface for allowing establishment of a first connection to a first remote entity and a second connection to a second remote entity, the first connection being a TFO connection. The gateway also includes a control entity operative to monitor the second connection; detect the presence of TFO messages received from the second remote entity; and in the presence of in-band TFO messages received from the second remote entity, establish an end-to-end TFO connection between the first and second remote entities.

These and other aspects and features of the present invention will now become apparent to those of ordinary skill in the art upon review of the following description of specific embodiments of the invention in conjunction with the accompanying drawings.

In the drawings, embodiments of the invention are illustrated by way of example. It is to be expressly understood that the description and drawings are only for purposes of illustration and as an aid to understanding, and are not intended to be a definition of the limits of the invention.

DETAILED DESCRIPTION OF THE PREFERRED EMBODIMENTS

Figure 1:
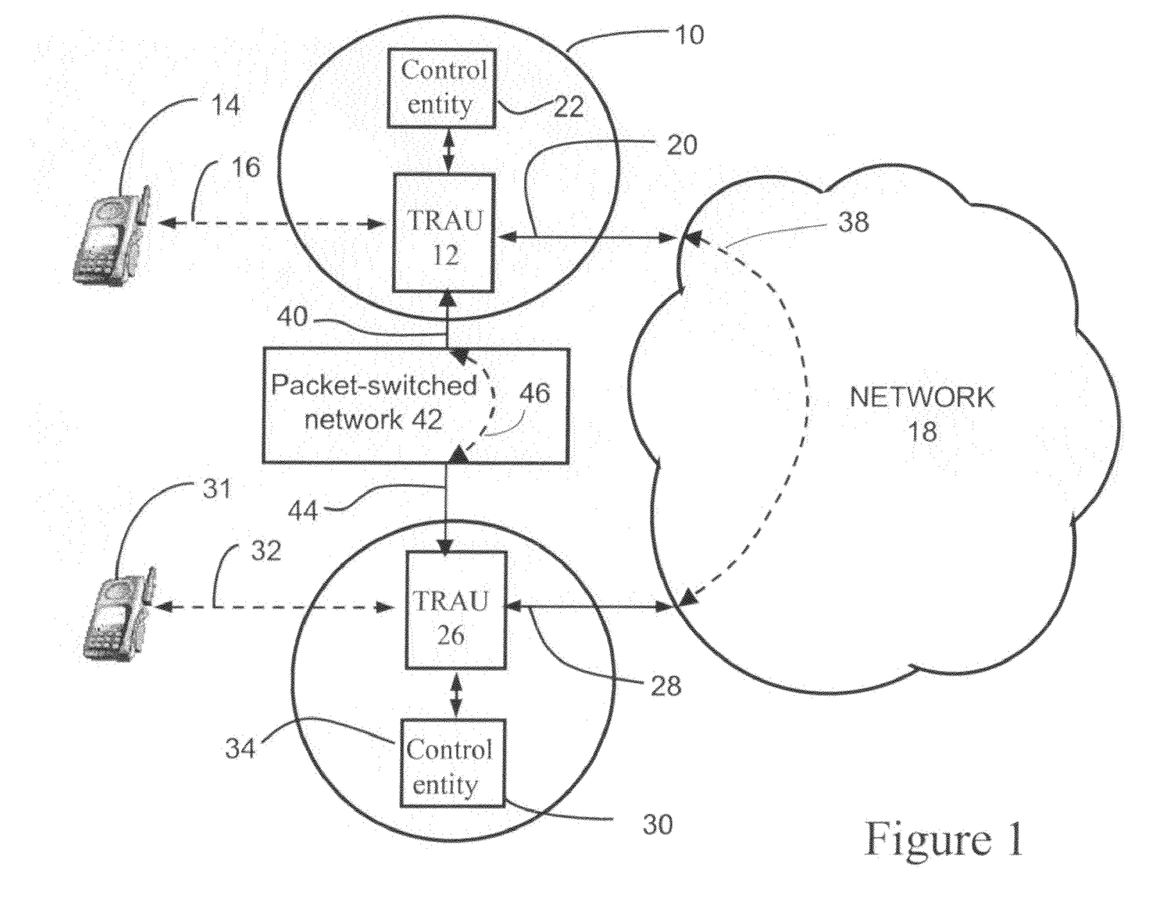
FIG. 1 illustrates an arrangement of network elements in accordance with an example of implementation of a first embodiment of the present inventive concept.

FIG. 1 illustrates an arrangement of network elements in accordance with an example of implementation of a first embodiment of the present inventive concept. In this first embodiment, a data communication apparatus is equipped with the functionality to use an in-band messaging protocol in determining whether to transfer any part of an existing connection, which includes in-band messaging, to an alternate communication path.

With particular reference to FIG. 1, there is shown a data communication apparatus 10, which can be a base station controller (BSC) in a cellular network such as TDM/CDMA and GSM. In a UMTS network, the data communication apparatus 10 may be referred to as a "core network". The data communication apparatus 10 includes a transcoder and rate adaptation unit (TRAU) 12, which is a term used in this specification to generically refer to a resource capable of data or speech compression and/or decompression and preferably of rate adaptation. To this end, the TRAU 12 may include a vocoder, an echo canceller and other functional components (not shown). The data communication apparatus 10 also includes a control entity 22 in communication with the TRAU 12 and equipped with suitable circuitry, software and/or control logic for providing call setup and call processing functionality, such as notification of impending handover, three-way calls, and so on.

The TRAU 12 includes an interface (not shown) for exchanging compressed speech parameters with a mobile unit 14 over a wireless link 16. The TRAU 12 is also connected through the interface to a network 18 via a communication link 20. In a specific example of implementation, the network 18 is a circuit-switched (time-division multiplexed) network across which speech samples are exchanged with a data communication apparatus 30, e.g., in a format such as G.711, G.722 or G.726. In the specific case of G.711, speech samples are exchanged at a rate of 64 kb/s. The conversion from compressed speech parameters to speech samples and vice versa is effected by a vocoder (not shown) in the TRAU 12. It should be understood that the network 18 may be a mixed circuit-switched and packet-switched network.

In addition, the TRAU 12 is equipped with the capability of participating in an in-band messaging protocol. This may be an enhanced version of the standardized tandem-free operation (TFO) protocol, in which case the TRAU 12 can be said to be "enhanced-TFO-capable" or "eTFO-capable". In the interest of clarity and simplicity, it will be assumed that the in-band messaging protocol is indeed an enhanced version of the standardized TFO protocol (hereinafter eTFO), since this would require only minor modifications to an existing standard. However, the reader skilled in the art will appreciate that there are myriad ways of implementing in-band messaging protocol without necessarily basing oneself on TFO, while remaining within the spirit of the present invention.

A control entity (not shown) in the TRAU 12, which is adapted to establish calls through the network 18, additionally uses the in-band messaging protocol to identify the existence of another eTFO-capable TRAU at the other end of the call and to negotiate a transfer of a portion of the call to a second communication path as will be described herein below.

Also shown in FIG. 1 is a second data communication apparatus 30, which can also be a base station controller (BSC) in a cellular network. The data communication apparatus 30 includes a transcoder and rate adaptation unit (TRAU) 26. In addition to the TRAU 26, the data communication apparatus 30 includes a control entity 34 equipped with suitable circuitry, software and/or control logic for providing call setup and call processing functionality, such as notification of impending handover, three-way calls, and so on.

For the purposes of this example, it is assumed that the data communication apparatus 10 is the calling party and that the data communication apparatus 30 is the called party, although the reverse may be the case without departing from the spirit of the present invention. It is also assumed that both TRAUs 12, 26 are eTFO-capable in order that a tandem-free connection is possible. Again, the relation between the in-band messaging protocol to TFO is made simply for convenience and need not be strictly adhered to.

The TRAU 26 in the data communication apparatus 30 is connected to the network 18 via a communication link 28, while it exchanges compressed speech parameters with a mobile unit 31 over a wireless link 32. The TRAU 26 further includes a control entity (not shown) which is responsible for communicating with the control entity (not shown) of the TRAU 12 by means of the in-band messaging protocol.

Moreover, in the embodiment illustrated in FIG. 1, the TRAUs are further connected to a common packet-switched network 42. Specifically, TRAU 12 has a communication link 40 to the packet-switched network 42 while TRAU 26 has a communication link 44 to the packet-switched network 42. Thus, it may be possible to establish an alternate communication path between TRAU 12 and TRAU 26 through the packet-switched network 42. It should be understood that an alternate communication path may also be established through the circuit-switched network 18 or through another network different from the packet-switched network 42 and to which the TRAUs 12, 26 are connected.

In operation, when a connection (e.g., a call) is set up between the data communication apparatus 10 and the data communication apparatus 30, a circuit-switched communication path 38 is established within the network 18 between communication link 20 of TRAU 12 and communication link 28 of TRAU 26 for the purposes of transmitting speech samples. In accordance with one example of a suitable in-band messaging signaling protocol, the TRAUs 12, 26 are eTFO-capable and TFO setup information and TFO speech information can be exchanged using different subsets of bits from among the bits ordinarily used for transmission of speech samples between the TRAU 12 and the TRAU 26 via circuit-switched communication path 38, a process commonly referred to as bit stealing.

By virtue of the in-band messaging signaling protocol, each TRAU 12, 26 will receive TFO setup information from the other TRAU, which will indicate to the recipient TRAU that a remote TRAU is attempting to enter a tandem-free mode of operation. During the negotiation process, various parameters may be exchanged between the TRAUs 12, 26 prior to effecting switch-over of a portion of the circuit-switched communication path 38 to a second communication path 46 (e.g., using asynchronous transfer mode adaptation layer 2—AAL2) through the packet-switched network 42. Example of messaging format may be ETSI Standard AMR or EFR.

For example, each TRAU 12, 26 will use the in-band messaging protocol to indicate to the other TRAU whether it has access to the packet-switched network 42. If both TRAUs 12, 26 have a link to the packet-switched network 42, as is the case in FIG. 1, addresses may be exchanged to allow the transmission of either the compressed or uncompressed speech signal in packet format over the second communication path 46 established through the packet-switched network 42, as defined by the addresses of the two data communication apparatus 10, 30. Another example of TFO setup information includes a list of codecs supported by the TRAU providing the information. Also during the negotiation process, information could be sent to each of the control entities 22, 34 in order to arrange for required changes in the routing of the packets.

Once the second communication path 46 has been established, part of the connection established via the communication path 38 is transferred to the second communication path 46. Such transfer may be done in several ways.

In a first variant, transmission of speech over the second communication path 46 takes place in compressed format, i.e., both TRAUs 12, 26 exchange TFO speech information with one another over the packet-switched network. If this is done while suspending the transmission of speech samples via the circuit-switched communication path 38 through the network 18, this will allow the codecs in both TRAUs 12, 26 to be disabled, resulting in resource savings. On the other hand, it may be desirable to continue exchanging speech samples along the circuit-switched communication path 38, even if only a reduced number of fixed-duration time slots are used. This may be done in the interest of maintaining synchronization between the two TRAUs 12, 26 in the event that the second communication path 46 fails and communication must revert back to use of the circuit-switched communication path 38 through the circuit-switched network 18. Still other variants will retain the circuit-switched connection path 38 in its entirety in order to perform voice quality enhancement functions.

In a second variant, it is within the scope of the invention to transfer speech samples in their decompressed format (e.g., G.711) across the second communication path 46. Thus, it will be appreciated that even though the second communication path 46 is established on the basis of the in-band messaging protocol revealing that both TRAUs 22, 26 are eTFO-capable and share access to the packet-switched network 42, it is not a requirement that TFO speech information be sent along the second communication path 46.

Those skilled in the art will further appreciate that when necessary, the data format can be altered in a dynamic fashion to meet any particular requirements, such as transmission of dual-tone multi-frequency (DTMF) signals, etc.

Figure 2:
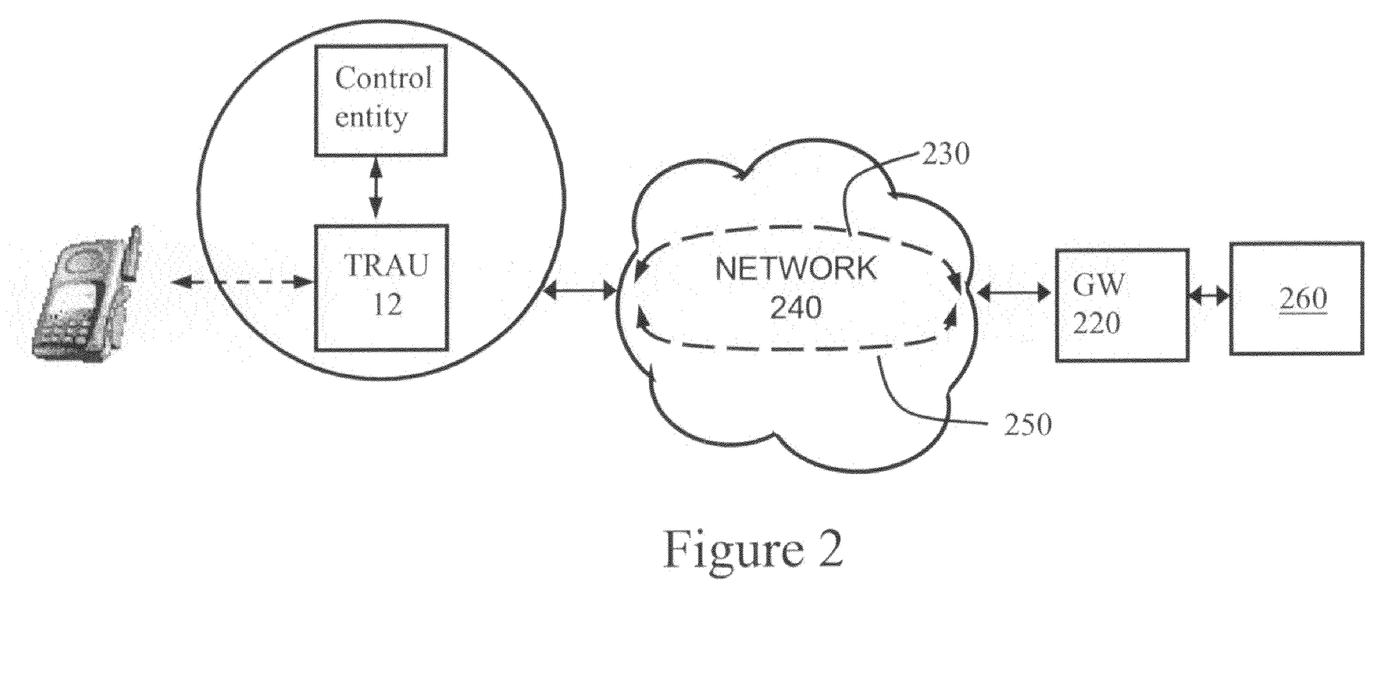
FIGS. 2 to 4 illustrate various arrangements of network elements in accordance with respective examples of implementation of a second embodiment of the present inventive concept.
Figure 3:
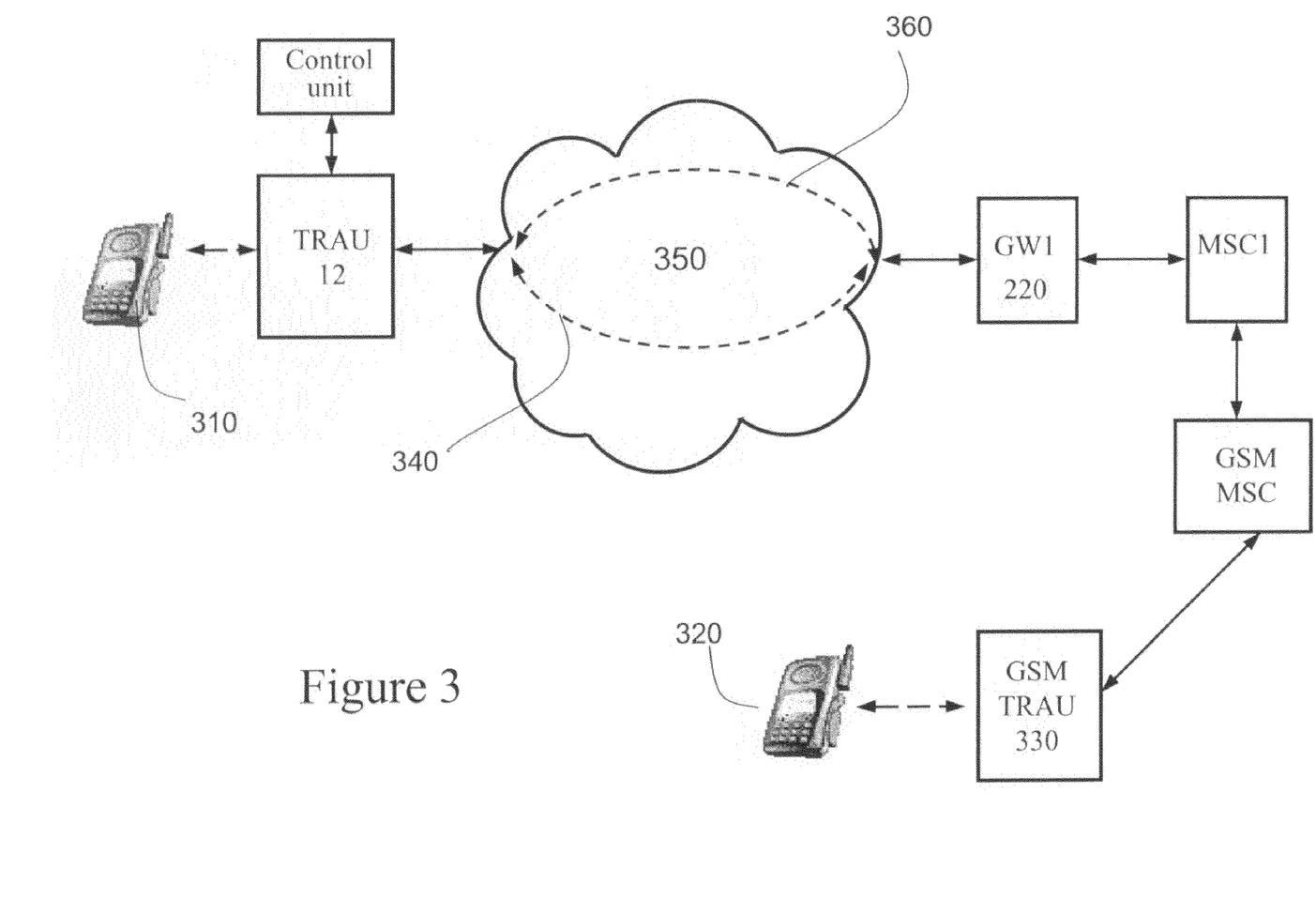
Figure 4:
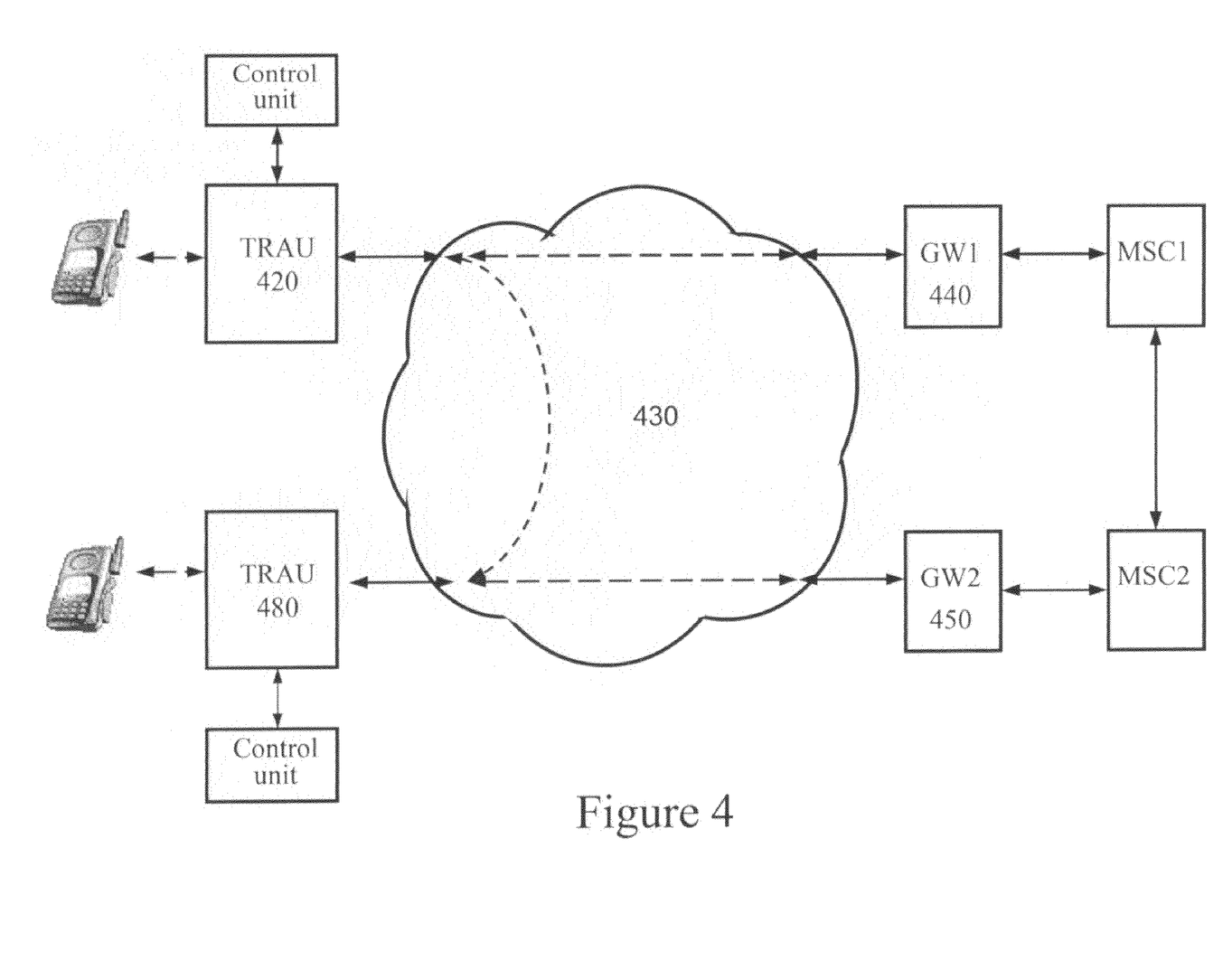

FIGS. 2 to 4 illustrate various arrangements of network elements in accordance with respective examples of implementation of a second embodiment of the present inventive concept. In this second embodiment, a gateway connected to a non-eTFO-capable entity is equipped with the intelligence to emulate a eTFO-capable entity. With particular reference to FIG. 2, TRAU 12 proceeds to send TFO setup information in an attempt to communicate with a remote entity 260 via a gateway 220. This is effected over a circuit-switched communication path 230 established through a network 240. The gateway 220 monitors the messages but, in anticipation of a response from remote entity 260, it does not respond.

After a timeout period, recognizing that the entity connected at the other end is not eTFO-capable, the gateway 220 can proceed to initiate its own response, with the ensuing handshaking resulting in the transmission of TFO speech information through a packet-switched communication path 250 established through the network 240. The gateway 220 includes a codec and an internal control entity similar to the internal control entity in the TRAU 12 described earlier with reference to FIG. 1. Note that the signal processing functionality previously associated with the TRAU 12 has been shifted to the gateway 220. In addition to coding and decoding, such functionality may include echo cancellation, automatic gain control and so on.

With particular reference to FIG. 3, there is shown a connection between 3G and 2G wireless networks. In this case, a call 360 is established between a mobile unit 310 (e.g., a UMTS mobile unit) and another mobile unit 320 (e.g., a GSM mobile unit) through a network 350. For this example, it is assumed that the GSM mobile unit 320 has a connection to the network 350 via a GSM TRAU 330. Ultimately, the execution of the in-band messaging protocol, as described earlier with reference to FIG. 2, will lead to transfer of the rate adaptation operation from TRAU 12 to gateway 220 and also to the transfer of traffic to a packet-switched communication path 340, resulting in minimization of the transmission bandwidth between the two nodes. In addition, execution of the in-band messaging protocol will result in establishment of tandem-free operation between gateway 220 and the GSM TRAU 330 and thus a virtual end-to-end tandem-free operation for the communication.

According to one variant, the gateway 220 detects the TFO setup information exchanged between the GSM TRAU 330 and TRAU 12, but will not react until those negotiations are concluded. However, the GSM TRAU 330 in this example is not linked to a packet-switched network, and thus the protocol will advance only to the extent of tandem-free operation. Gateway 220 can monitor the process to recognize that the full optimization has not been achieved. It can then carry out a dialog with the TRAU 12 to transfer the rate adaptation operation to gateway 220 and transfer the tandem-free connection to a packet-switched communication path 340 through the network 350, thus reducing the transmission bandwidth between the two nodes.

According to another variant, the gateway 220 detects the TFO setup information messages exchanged between the GSM TRAU 330 and TRAU 12 and recognizes that the remote GSM TRAU 330 is incapable of enhanced TFO (eTFO). Gateway 220 will then engage in a two-way handshaking with TRAU 12 and the GSM TRAU 330 to transfer the rate adaptation operation from TRAU 12 to gateway 220, and to exchange TFO speech information with the GSM TRAU 330.

With particular reference to FIG. 4, there is shown a more complex scenario for the signal path, where an original connection originates from a TRAU 420, traverses a packet-switched network 430 and gateways 440, 450, before connecting to a second TRAU 480 back through the packet-switched network 430. Once the in-band messaging protocol is exercised through to the exchange of the addresses of the two TRAUs 420, 480, a second path 460 through the packet-switched network 430 is chosen to continue the transmission of the traffic signal. The handshaking sequence is as follows: TRAU 420 and TRAU 480 initiate the in-band messaging protocol, identifying themselves as "endpoint" units. The in-path gateways 440, 450 recognize the exchange between two endpoint TRAUs 420, 480 and allow the transfer to take place.

Figure 5:
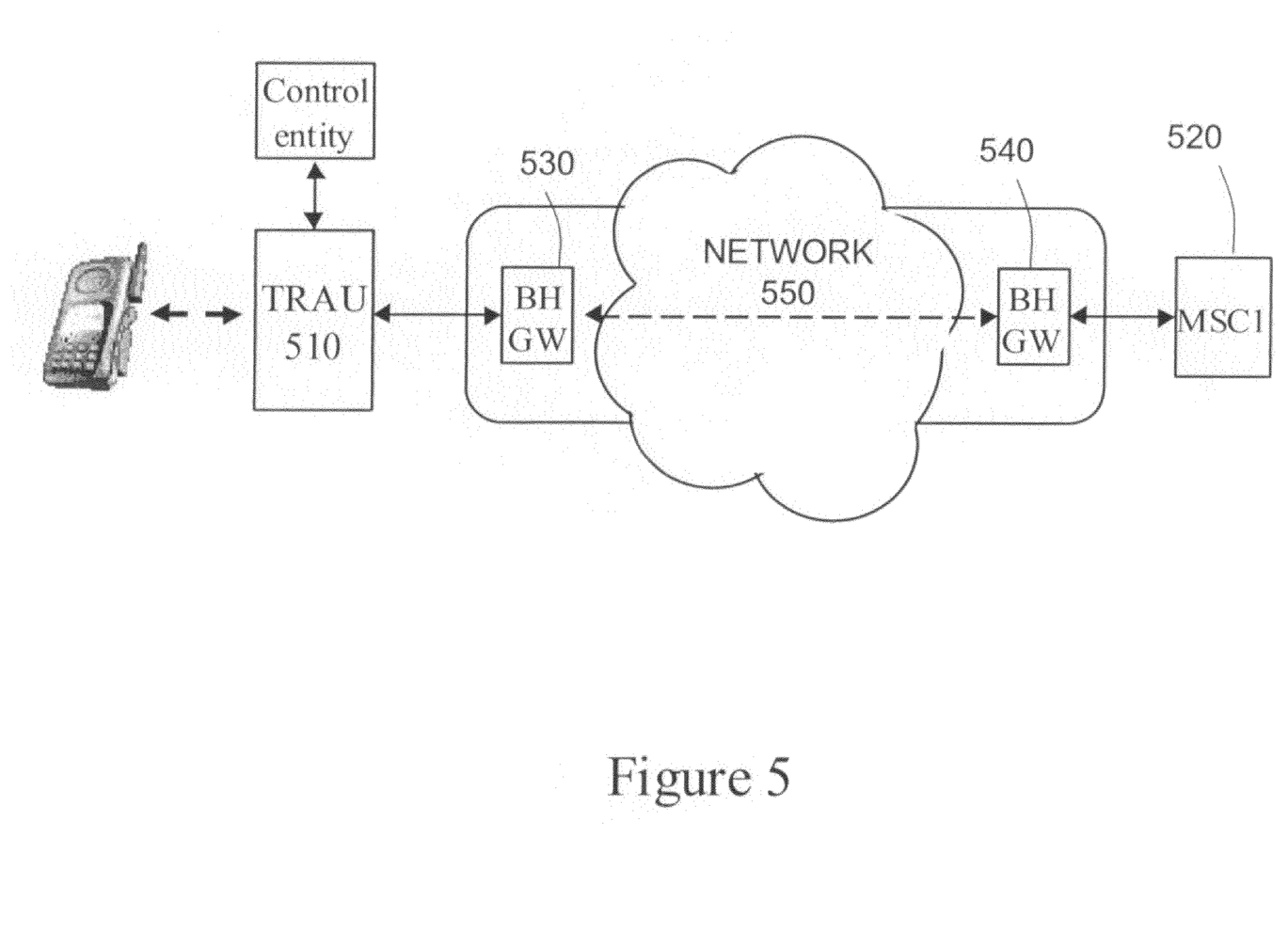
FIG. 5 illustrates an arrangement of network elements in accordance with an example of implementation of a third embodiment of the present inventive concept.

FIG. 5 illustrates an arrangement of network elements in accordance with an example of implementation of a third embodiment of the present inventive concept. According to this third embodiment, a "backhaul" gateway that employs a codec format that is incompatible with standardized tandem-free operation is given the intelligence to allow tandem-froo operation to take place and reduce bandwidth.

With particular reference to FIG. 5, there is shown a network configuration, in which a TRAU 510 is connected to a remote entity, in this case a mobile switching center (MSC) 520 through a pair of "backhaul" gateways 530, 540 at either end of a network 550. Such gateways 530, 540 are likely to operate codecs such as G.729, G.726, or G.723.1, which are not compatible with tandem-free operation. In particular, tandem-free operation is facilitated when certain specified bits of a G.711 sample stream are used to transmit the TFO setup information or the TFO speech information. However, the use of a codec that manipulates the G.711 sample stream is likely to distort the information contained therein.

This will result in the tandeming of two codecs in land-mobile connections, and at least three codecs in mobile-mobile calls. One way to avoid this problem is to provide the backhaul gateways 530, 540 with the intelligence to recognize and support the in-band messaging protocol. If this case, transfer of the TFO speech information would be exchanged without bit-stealing the data in the incompatible format exchanged between the backhaul gateways 530, 540. The TFO speech information could then be carried from, say, backhaul gateway 530 to backhaul gateway 540, whereupon it will be injected back into the G.711 sample stream in place of the incompatible transcoding in backhaul gateways 530 and 540.

The mechanism just described with reference to FIG. 5 permits the various scenarios described herein above with reference to FIGS. 1-4 to reach their optimal mode of operation despite the presence of backhaul gateways 530, 540 with incompatible codecs. For example, in a call scenario that involves a gateway connected to a circuit-switched network, the gateway may need to be provided not only with the functionality to bypass an incompatible codec as described in connection with FIG. 5, but also with the functionality described in connection with FIG. 2, wherein the gateway acquires the functionality of a TRAU, hence allowing enhanced TFO (eTFO) to take place. In such a case, signal processing functionality can be shifted from the TRAU to the edge of a network.

Figure 6:
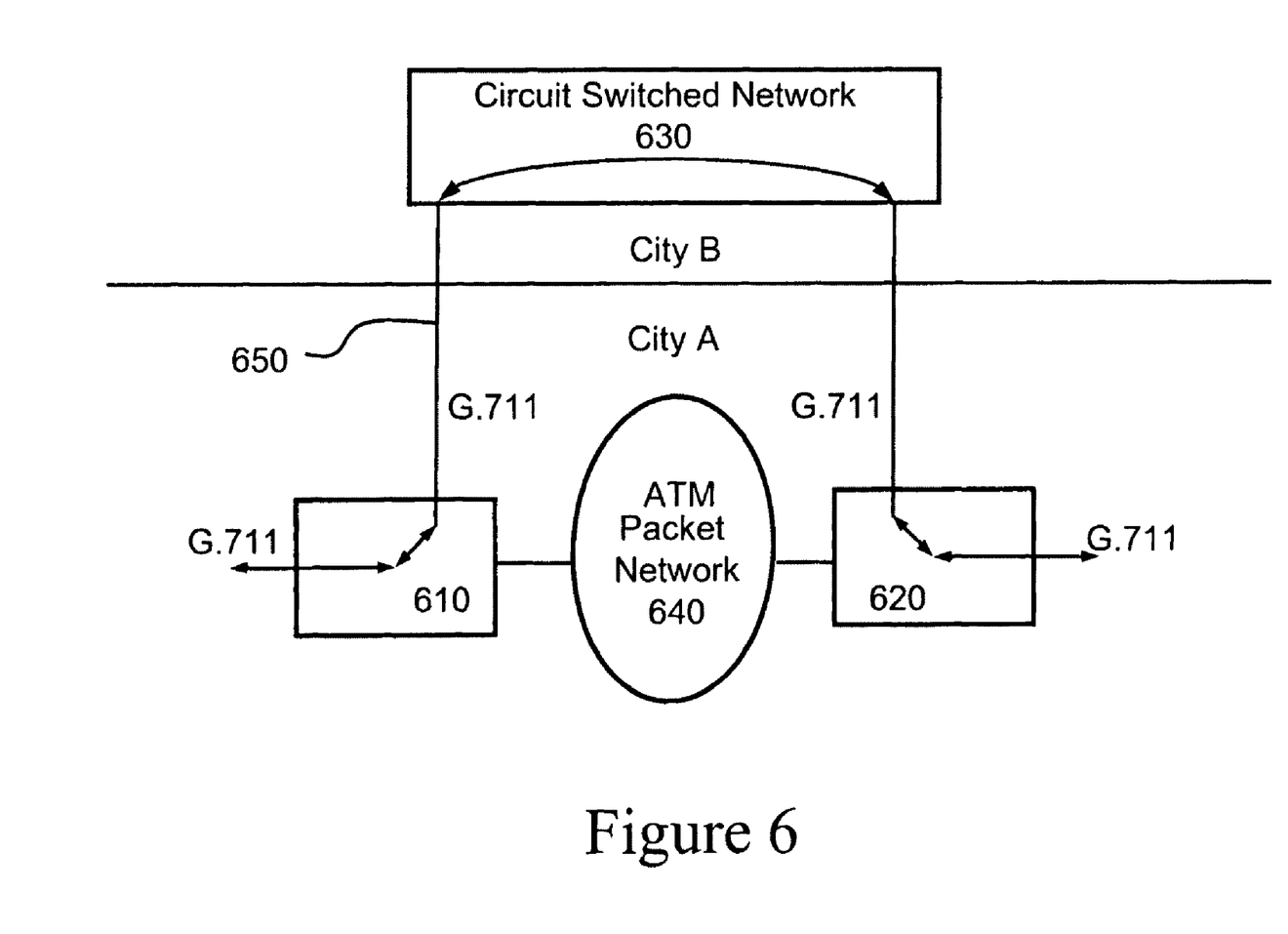
FIGS. 6 to 8 illustrate an example of a call scenario in accordance with an example of implementation of a fourth embodiment of the present inventive concept.
Figure 7:
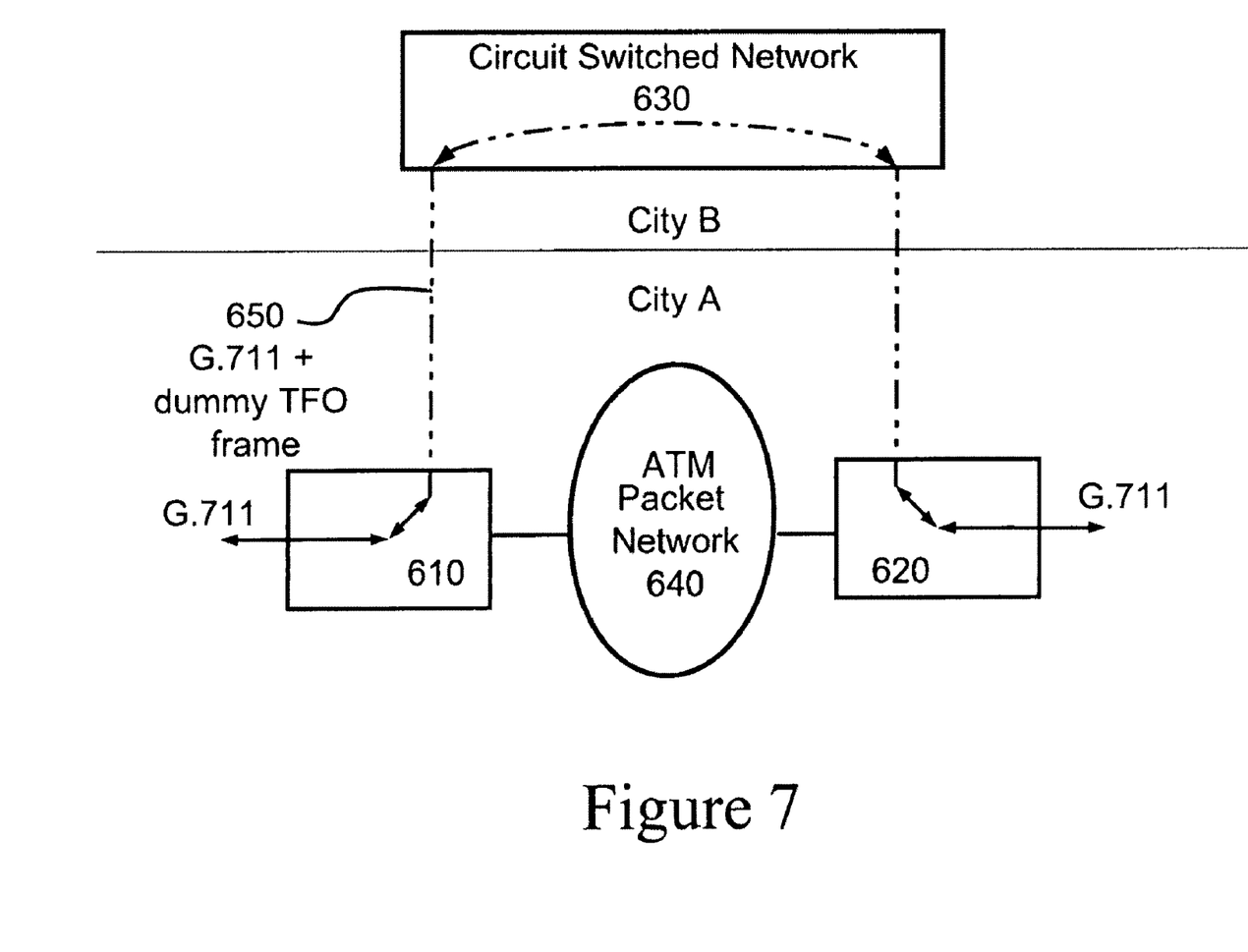
Figure 8:
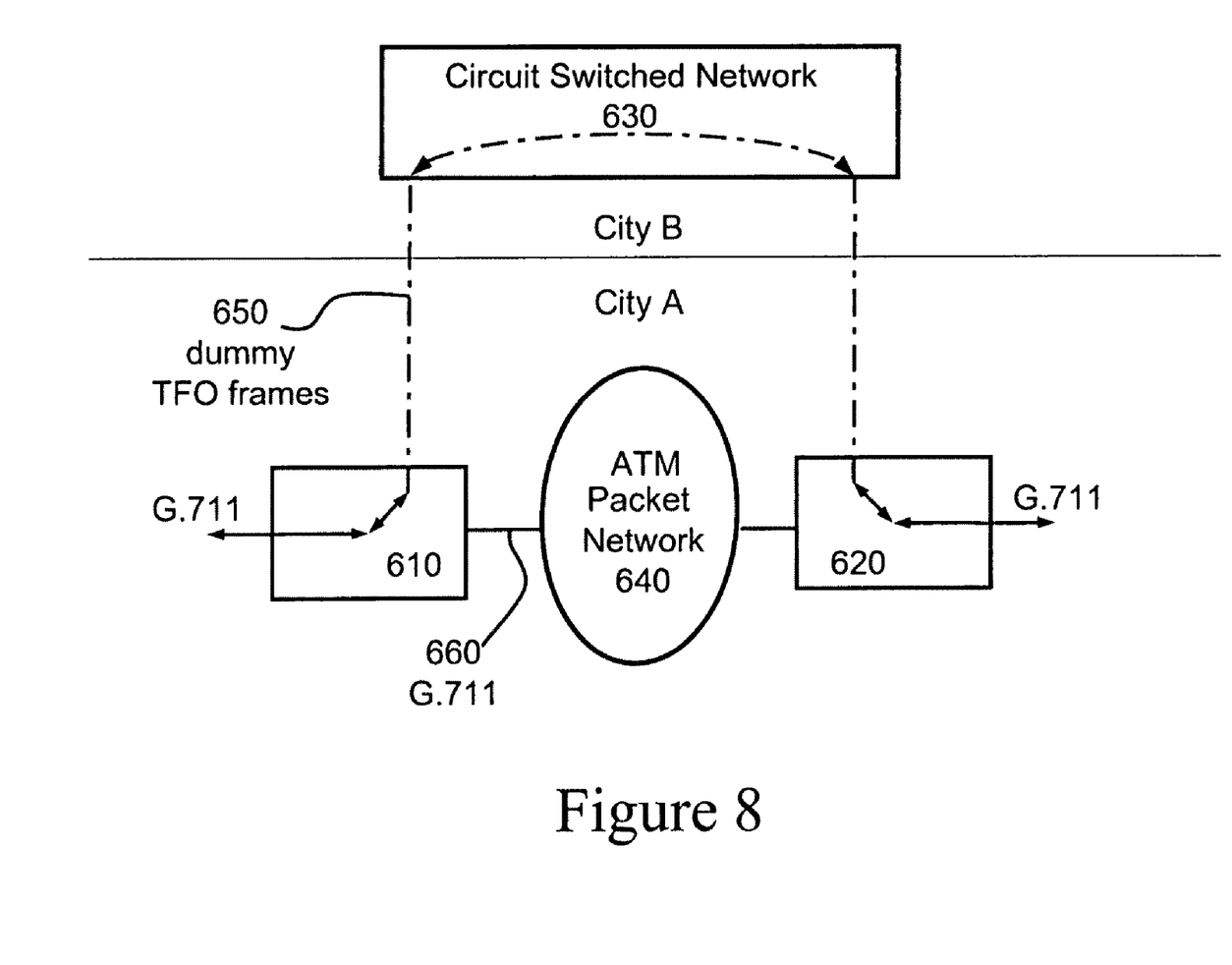

FIGS. 6 to 8 illustrate an example of a call scenario in accordance with an example of implementation of a fourth embodiment of the present inventive concept. According to this fourth embodiment, an in-band eTFO connection is used as a backup connection while speech samples are transmitted over a packet-switched network. With particular reference to FIG. 6, a call is to take place between parties via two gateways 610, 620 both located in City A. Both gateways 610, 620 have access to a circuit-switched network 630 that is configured in such a way as to require the call to be routed through City B. The data format exchanged over the network 630 is assumed to be G.711 for the purposes of the present example, although other formats are possible. In addition, both gateways 610, 620 are linked via a packet-switched network, say an ATM network 640.

FIG. 6 illustrates the situation during call initiation. The call starts in the normal way with an inter-city path 650 being established over a network 630. Each gateway 610, 620 thus exchanges G.711 data via City B over the path 650, without involving the packet-switched network 640. Once the call is established, either one or both gateways 610, 620 start probing the path 650 by way of the in-band messaging protocol in order to identify peers, i.e., to determine whether another gateway along the path 650 is also eTFO-compatible. In this case, it is assumed that the gateways 610, 620 identify one another as peers and that the gateways 610, 620 proceed to establish an in-band eTFO connection over the path 650.

FIG. 7 illustrates the situation once an in-band eTFO connection has been established between the gateways 610, 620 via City B. Specifically, the path 650 carries the G.711 data as well as in-band messaging information. However, the in-band messaging information may consist of a reduced amount of in-band messaging information as compared with that required to transmit TFO speech information. In other words, the in-band eTFO connection may involve the transmission of "dummy" frames, where by "dummy frame" is meant a frame sent by one of the gateways 610, 620 that the other gateway will recognize such that the in-band eTFO connection will be maintained, i.e., not dropped. The objective of the eTFO connection in this particular embodiment is to keep the connection over path 650 alive so as to maintain a path that can be used as a fallback position in the event of a disturbance, as will be described in greater detail herein below.

At this point, the gateways 610, 620 proceed to transfer the portion of the connection containing speech samples over to the packet-switched network 640. The purpose of this negotiation process, which may require out-of-band resources, is for the gateways 610, 620 to establish a "short-cut" path therebetween by passing through the packet-switched network, which does not pass through City B.

FIG. 8 illustrates the situation when the portion of the path 650 containing G.711 speech samples has been transferred to the short-cut path 660. The G.711 data now flows through the packet-switched network 640. Meanwhile, the in-band eTFO connection over the path 650 is still kept alive by sending only basic signaling information. It will be appreciated that the bandwidth used by this residual eTFO connection is small.

In a scenario wherein the entity at City B via which the eTFO connection is maintained "disturbs" the call such as by attempting a call conferencing or call transfer operation then operation returns to the scenario at FIG. 6, where the G.711 data flow is routed via City B and the connection through the packet-switched network 640 is severed.

Although various ways of negotiating the establishment of a second communication path using in-band signaling have been described, it is to be understood that variations of the present invention in which recourse is had to out-of-band signaling are within the scope of the present invention. Moreover, it is to be appreciated that once negotiation is complete, the actual establishment of the second communication path may also involve out-of-band resources.

It will also be appreciated that the functional elements of the TRAUs and gateways described above may be implemented as an arithmetic and logic unit (ALU) having access to a code memory which stored program instructions for the operation of the ALU. The program instructions could be stored on a medium which is fixed, tangible and readable directly by the TRAU or gateway, (e.g., removable diskette, CD-ROM, ROM, or fixed disk), or the program instructions could be stored remotely but transmittable to the TRAU or gateway via a modem or other interface device (e.g., a communications adapter) connected to a network over a transmission medium. The transmission medium may be either a tangible medium (e.g., optical or analog communications lines) or a medium implemented using wireless techniques (e.g., microwave, infrared or other transmission schemes).

Those skilled in the art should also appreciate that the program instructions stored in the code memory can be compiled from a high level program written in a number of programming languages for use with many computer architectures or operating systems. For example, the high level program may be written in assembly language, while other versions may be written in a procedural programming language (e.g., "C") or an object oriented programming language (e.g., "C++" or "JAVA").

Those skilled in the art will further appreciate that in some embodiments of the invention, the functionality of the TRAUs and gateways may be implemented as pre-programmed hardware or firmware elements (e.g., application specific integrated circuits (ASICs), electrically erasable programmable read-only memories (EEPROMs), etc.), or other related components.

While specific embodiments of the present invention have been described and illustrated, it will be apparent to those skilled in the art that numerous modifications and variations can be made without departing from the scope of the invention as defined in the appended claims.

We claim:

1. A data communication apparatus, comprising:
a port for enabling data communication with a remote entity via a network;
a control entity in communication with said port and operative to:
establish a connection with the remote entity over a first communication path through the network, wherein the connection established over the first communication path includes an exchange of data between said data communication apparatus and the remote entity;
negotiate with the remote entity using in-band signaling over the first communication path to establish a second communication path between said data communication apparatus and the remote entity allowing the transmission of data from (a) said data communication apparatus and (b) the remote entity to the other of (a) said data communication apparatus and (b) the remote entity;
transfer at least part of the connection to the second communication path upon determining that the connection can be transferred to the second communication path, while allowing a continued exchange of data with the remote entity over the first communication path; and
transfer the at least part of the connection back to the first communication path upon determining that the second communication path has failed.

2. A data communication apparatus as defined in claim 1, wherein the second communication path is established through a packet-switched network.

3. A data communication apparatus as defined in claim 2, further comprising:
a codec for processing audio information exchanged with the remote entity over the first communication path.

4. A data communication apparatus as defined in claim 3, wherein the connection established over the first communication path includes an exchange of uncompressed data between said data communication apparatus and the remote entity.

5. A data communication apparatus as defined in claim 4, wherein said control entity being operative to negotiate with the remote entity using in-band signaling includes said control entity being operative to:
exchange in-band Tandem-Free Operation (TFO) messages with the remote entity over the first communication path; and
determine whether the connection can be transferred to the second communication path at least in part on the basis of the in-band TFO messages.

6. A data communication apparatus as defined in claim 5, wherein said control entity being operative to effect the transfer of at least part of the connection to the second communication path includes said control entity being operative to establish an exchange of compressed data with the remote entity over the second communication path.

7. A data communication apparatus as defined in claim 6, wherein said control entity being operative to negotiate with the remote entity using in-band signaling further includes said control entity being operative to send to the remote entity an address of said data communication apparatus in the packet-switched network.

8. A data communication apparatus as defined in claim 7, wherein said control entity being operative to negotiate with the remote entity using in-band signaling further includes said control entity being operative to receive from the remote entity an address of the remote entity in the packet-switched network.

9. A data communication apparatus as defined in claim 8, wherein said control entity being operative to establish an exchange of compressed data with the remote entity over the second communication path includes said control entity being operative to direct compressed data to the address of the remote entity in the packet-switched network.

10. A data communication apparatus as defined in claim 7, wherein said control entity being operative to effect the transfer of at least part of the connection to the second communication path further includes said control entity being operative to suspend an exchange of uncompressed data with the remote entity over the first communication path.

11. A data communication apparatus as defined in claim 1, wherein the continued exchange of data comprises a continued exchange of uncompressed data.

12. A data communication apparatus as defined in claim 1, wherein the network is a mixed circuit-switched and packet-switched network.

13. A data communication apparatus as defined in claim 12, wherein the first communication path is a circuit-switched path.

14. A data communication apparatus as defined in claim 7, wherein said control entity being operative to effect the transfer of at least part of the connection to the second communication path further includes said control entity being operative to establish an exchange of uncompressed data with the remote entity over the second communication path.

15. A data communication apparatus as defined in claim 1, further comprising a second port for communication with a mobile unit over a wireless communication link.

16. A data communication apparatus as defined in claim 15, wherein said control entity is further operative to establish a wireless exchange of compressed data with the mobile unit over the wireless communication link.

17. A data communication apparatus as defined in claim 5, wherein said control entity being operative to effect the transfer of at least part of the connection to the second communication path includes said control entity using out-of-band signaling to effect the transfer.

18. A data communication apparatus as defined in claim 1, wherein said control entity being operative to effect the transfer of at least part of the connection to the second communication path includes said control entity being operative to establish an exchange of uncompressed data with the remote entity over the second communication path and to establish an exchange of compressed data over the first communication path.

19. A data communication apparatus as defined in claim 18, wherein said control entity being operative to establish an exchange of compressed data over the first communication path includes said control entity being operative to establish an exchange of only as much compressed data as is necessary to keep the first communication path alive.

20. A data communication apparatus as defined in claim 1, wherein the network is a circuit-switched network and wherein the first communication path is a circuit-switched path.

21. A non-transitory computer-readable storage medium containing a program element for execution by a data communication device to implement a transcoder and rate adaptation unit (TRAU), said TRAU including a control entity operative to:
establish a connection with a remote entity over a first communication path through a network, wherein the connection established over the first communication path includes an exchange of data between said data communication apparatus and the remote entity;

negotiate with the remote entity using in-band signaling to establish a second communication path between the data communication apparatus and the remote entity allowing the transmission of data from (a) the data communication apparatus and (b) the remote entity to the other of (a) the data communication apparatus and (b) the remote entity;

transfer at least part of the connection to the second communication path upon determining that the connection can be transferred to the second communication path while allowing a continued exchange of data with the remote entity over the first communication path; and transfer the at least part of the connection back to the first communication path upon determining that the second communication path has failed.

* * * * *